United States Patent
Bailey et al.

(10) Patent No.: US 7,026,951 B2
(45) Date of Patent: Apr. 11, 2006

(54) DATA TELEMETRY SYSTEM FOR MULTI-CONDUCTOR WIRELINES

(75) Inventors: Jeffrey R. Bailey, Houston, TX (US); Marion M. Ringo, League City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 717 days.

(21) Appl. No.: 10/073,799

(22) Filed: Feb. 11, 2002

(65) Prior Publication Data

US 2003/0011490 A1 Jan. 16, 2003

Related U.S. Application Data

(60) Provisional application No. 60/305,313, filed on Jul. 13, 2001.

(51) Int. Cl.
*G01V 3/00* (2006.01)

(52) U.S. Cl. .............. 340/854.3; 340/854.9; 340/855.5; 340/855.7

(58) Field of Classification Search .......... 340/854.3, 340/854.9, 855.5, 855.7
See application file for complete search history.

(56) References Cited

U.S. PATENT DOCUMENTS

| | | | | |
|---|---|---|---|---|
| 2,986,214 | A | 5/1961 | Wiseman Jr., et al. | 166/55 |
| 3,118,501 | A | 1/1964 | Kenley | 166/55 |
| 3,514,750 | A | 5/1970 | Pritchett et al. | 340/18 |
| 3,603,923 | A | * 9/1971 | Nelligan | 340/854.9 |
| 3,662,833 | A | 5/1972 | Kisling, III | 166/314 |
| 3,982,841 | A | 9/1976 | Endzweig | 403/19 |
| 4,102,401 | A | 7/1978 | Erbstoesser | 166/284 |
| 4,113,314 | A | 9/1978 | Savanick et al. | 299/4 |

(Continued)

FOREIGN PATENT DOCUMENTS

| | | |
|---|---|---|
| CA | 2044877 | 11/1991 |
| EP | 0 082 524 | 6/1983 |
| EP | 0 138 271 | 5/1984 |
| GB | 2 230 091 | 10/1990 |
| GB | 2275337 | 8/1994 |
| GB | 2409722 | 7/2005 |
| WO | WO 93/08485 | 4/1993 |

OTHER PUBLICATIONS

Corresponding PCT Application No. PCT/US02/15070, Written Opinion dated Apr. 30, 2003.

John W. Kiowski, "In–Field Quality Control of VSP Data", Oil & Gas Journal, Feb. 23, 1987, pp. 71–75.

William Barry, and Gildas Omnes, "Multilevel Geophone Tool Strings Improve Well Seismic Projects", Oil & Gas Journal, Jan. 14, 1991, pp. 73–75.

Richard E. Peterson, Roy Wilmer, Karl H. Frohne, CER Corporation, "Application of Microseismic Technology to Hydraulic Fracture Diagnostics: GRI/DOE Field Fracturing Multi–Sites Project Report", Jul. 28, 1993 to Jul. 27, 1996, pp. 595–614.

(Continued)

*Primary Examiner*—Timothy Edwards, Jr.
(74) *Attorney, Agent, or Firm*—Gary P. Katz; Brent R. Knight

(57) ABSTRACT

An improved data telemetry system for multi-conductor wirelines to achieve satisfactory transmission of analog and digital signals with frequency content up to 100 kHz by assigning at least two conductors to a first terminal of a data transmittal means and to a first terminal of a data receiver means and connecting at least one additional conductor to a second terminal of a data transmittal means and to a second terminal of a data receiver means. Pairing conductors reduces attenuation and crosstalk and permits the signal to contain multiple frequency modulated carrier bands with individual channel bandwidths of up to 3 kHz or higher.

27 Claims, 9 Drawing Sheets

U.S. PATENT DOCUMENTS

| | | | |
|---|---|---|---|
| 4,244,425 A | 1/1981 | Erbstoesser | 166/284 |
| 4,415,895 A | 11/1983 | Flagg | 340/856 |
| 4,428,422 A | 1/1984 | Laurent | 166/212 |
| 4,637,468 A | 1/1987 | Derrick | 166/297 |
| 4,646,083 A | 2/1987 | Woods | 340/856 |
| 4,671,352 A | 6/1987 | Magee, Jr. et al. | 166/186 |
| 4,686,653 A | 8/1987 | Staron et al. | 367/25 |
| 4,702,316 A | 10/1987 | Chung et al. | 166/272 |
| 4,706,224 A | 11/1987 | Alford | 367/41 |
| 4,776,393 A | 10/1988 | Forehand et al. | 166/55 |
| 4,796,026 A | 1/1989 | Hammond | 340/857 |
| 4,809,781 A | 3/1989 | Hoefner | 166/273 |
| 4,855,732 A | 8/1989 | Cretin et al. | 340/856 |
| 4,870,580 A | 9/1989 | Lang et al. | 702/14 |
| 4,881,207 A | 11/1989 | Dubesset et al. | 367/31 |
| 4,888,740 A | 12/1989 | Brie et al. | 367/30 |
| 4,891,641 A | 1/1990 | Gard et al. | 340/857 |
| 4,910,718 A | 3/1990 | Horn | 367/124 |
| 4,992,994 A | 2/1991 | Rambow et al. | 367/25 |
| 5,010,527 A | 4/1991 | Mahrer | 367/86 |
| 5,044,461 A | 9/1991 | Aronstam | 181/102 |
| 5,060,751 A | 10/1991 | Kuhlman et al. | 181/102 |
| 5,062,084 A | 10/1991 | Schoepf et al. | 367/13 |
| 5,111,903 A | 5/1992 | Meynier | 181/102 |
| 5,172,480 A | 12/1992 | Labuc et al. | 33/304 |
| 5,189,262 A | 2/1993 | Engler et al. | 181/102 |
| 5,212,354 A | 5/1993 | Miller et al. | 181/108 |
| H1232 H | 9/1993 | DiSiena | 367/57 |
| 5,243,337 A | 9/1993 | Beauducel et al. | 340/855.3 |
| 5,243,544 A | 9/1993 | Schoess | 364/566 |
| 5,253,219 A | 10/1993 | Houston et al. | 367/79 |
| 5,290,159 A | 3/1994 | Miller et al. | 417/521 |
| 5,309,995 A | 5/1994 | Gonzalez et al. | 166/284 |
| 5,314,019 A | 5/1994 | Honarpour | 166/270 |
| 5,321,612 A | 6/1994 | Pickering, Jr. et al. | 181/122 |
| 5,353,875 A | 10/1994 | Schultz et al. | 166/297 |
| 5,363,094 A | 11/1994 | Staron et al. | 340/854 |
| 5,370,545 A | 12/1994 | Laurent | 439/190 |
| 5,387,907 A | 2/1995 | Gardner et al. | 340/854.9 |
| 5,475,187 A | 12/1995 | Omnes | 181/102 |
| 5,481,502 A | 1/1996 | Cretin et al. | 367/77 |
| 5,485,882 A | 1/1996 | Bailey et al. | 166/284 |
| 5,495,483 A | 2/1996 | Grube et al. | 370/95.1 |
| 5,503,225 A | 4/1996 | Withers | 166/250.1 |
| 5,504,479 A | 4/1996 | Doyle et al. | 340/854.9 |
| 5,513,703 A | 5/1996 | Mills et al. | 166/55 |
| 5,550,785 A | 8/1996 | Laurent et al. | 367/25 |
| 5,579,844 A | 12/1996 | Rebardi et al. | 166/296 |
| 5,594,706 A | 1/1997 | Shenoy et al. | 367/76 |
| 5,747,750 A | 5/1998 | Bailey et al. | 181/112 |
| 5,771,170 A | 6/1998 | Withers et al. | |
| 5,803,178 A | 9/1998 | Cain | 166/306 |
| 5,865,252 A | 2/1999 | van Petegem et al. | 166/297 |
| 5,890,536 A | 4/1999 | Nierode et al. | 166/284 |
| 5,917,160 A | 6/1999 | Bailey | 181/112 |
| 5,934,377 A | 8/1999 | Savage | 166/281 |
| 5,954,133 A | 9/1999 | Ross | 166/297 |
| 5,996,687 A | 12/1999 | Pringle et al. | 166/66 |
| 6,016,727 A | 1/2000 | Morgan | 181/102 |
| 6,172,994 B1 | 1/2001 | Schaffner et al. | 370/529 |
| 6,186,230 B1 | 2/2001 | Nierode | 166/250 |
| 6,189,621 B1 | 2/2001 | Vail, III | 166/385 |
| 6,257,332 B1 | 7/2001 | Vidrine et al. | 166/250 |
| 6,296,066 B1 | 10/2001 | Terry et al. | 175/92 |
| 6,369,718 B1 | 4/2002 | Mathieu | 340/853.7 |
| 6,396,415 B1 | 5/2002 | Bulmer | 340/855.8 |
| 6,473,616 B1 | 10/2002 | Sydor | 455/446 |
| 6,486,116 B1 | 11/2002 | Hinton | 181/108 |
| 6,552,665 B1 | 4/2003 | Miyamae et al. | 340/854.9 |

OTHER PUBLICATIONS

"Assessment of Borehole Seismic Fracture" *National Technical Information Service*, (1988) 11 pgs.

Kirichenko, Oleg V. et al. (1993) "Fiber–Optic Sensors for Vibration Registration by means of Interferometry and Speckle–Interferometry Methods", *SPIE—Fiber Optic and Laser Sensors XI*, vol. 2070, pp. 409–415.

Lacy, L. L., (1984) "Comparison of Hydraulic–Fracture Orientation Techniques," *Society of Petroleum Engineers*, pp. 322–332.

Li, Y. G. et al. (1988) "Stress Orientation Inferred from Shear Wave Splitting in Basement Rock at Cajon Pass", *Geophysical Research Letter*, vol. 15, No. 9, Paper No. BL7356, pp. 997–1000.

Mari, J. L. et al. (1989) "Well Seismic Part One: The Vertical Seismic Profile, Basic Principles, Applications and Implementation", *1142 Revue de l'Institut Francais du Petrole*, 44, No. 2, Paris, France, 35 pages of transition.

Mykkeltveit, S. et al (1984) "Processing of Regional Seismic Events using Data from Small–Aperture Arrays", *Bulletin of the Seismological Society of America*, vol. 74, No. 6, pp. 2313–2333.

Pechstedt, R. D. et al (1993) "Optical Fibre Accelerometers for High Temperature Applications", *SPIE—Fiber Optic and Laser Sensors XI*, vol. 2070, pp. 352–359.

Schlumberger Oilfield Review, pp. 10–14, Jan. 1994.

Schmidt, M. et al. (1989) "A Digitally–Controlled Broad–Band Seisomometer", *Gerlands Beitr. Gophysik Leipzig*, 98 1, S. pp. 84–87

Sleefe, G. E., et al., (1993) "Observations of Broad–Band Micro–Seisms During Resevoir Stimulation", *63rd SEG Meeting*, Washington.

Sleefe, G. E., et al., (1991) "Experimental Study of an Advanced Three–Component Borehole Seismic Receiver," 1991, *61st SEG Meeting*, Houston, Texas.

Sleefe, G.E., et al., (1993) "Rapid Acquisition of High Resolution Full Wavefield Borehole Seismic Data" *Soc. of Exploration Geophysicist*, 63rd Annual Mtg., Washington, DC, 7 pages.

Stewart, L., et al. (1992) "Acoustic–Emission Monitoring During Hydraulic Fracturing," *Society of Petroleum Engineers Formation Evaluation*, pp. 139–144, 1992.

Thorne, B.J. et al (1988) "An Assessment of Borehole Seismic Fracture Diagnostics", *SPE 63rd Annual Technical Conference*, Houston, TX, Paper No. 3, (Oct. 22–5 1988) pp. 123–131.

Warpinski, N. R. et al. (1995) "Microseismic Mapping of Hydraulic Fractures Using Multi–Level Wireline Receivers", SPE 30507, Dallas, Texas, pp. 579–589.

Davis, C . et al. (1988) "Fiber–Optic Sensors for Geophysical Applications", *SPIE—Fiber Optic and Laser Sensors VI*, vol. 985, pp. 26–32.

Dobecki, T. L., (1983) "Hydraulic Fracture Orientation Using Passive Borehole Seismics,"*Society of Petroleum Engineers*, No. 12110.

Engi, D. (1989) "A Spherical–Stochastic Methodology for Microseismic Event Location", *Compters & Geosciences*, vol. 15, No. 7, pp. 1037–1052.

Hartenberger, R. A. et al. (1970) "Influence of Number and Spacing of Sensors on the Effectiveness of Seismic Arrays", *32nd Meeting of the European Association of Exploration Geophysicists*, Edinburgh, pp. 771–784.

Ilderton, David C. et al., (1993) "Microseismic Imaging of Hydrofractures with the Aid of Conical Wgaves,"*63rd SEG Meeting*, pp. 267–270.

\* cited by examiner

DATA TELEMETRY SYSTEM FOR MULTI-CONDUCTOR WIRELINES

RELATED U.S. APPLICATION DATA

This application claims the benefit of U.S. Provisional Application No. 60/305,313, filed Jul. 13, 2001.

FIELD OF THE INVENTION

This invention relates generally to the field of wireline data telemetry. Specifically, the invention is an improved data telemetry system for use with a conventional multi-conductor wireline.

BACKGROUND OF THE INVENTION

A multi-conductor wireline with integral electrical conductors is often used in the oil and gas industry to physically transport a logging tool downhole and to transmit data between a downhole tool and a surface station. Generally, most of the data transfer involves sending data from the tool to recording equipment located on the surface, but certain applications require sending data down to the tool from the surface. The wireline may have from one to seven or more separate electrical conductors, typically composed of copper, depending on the requirements of the application. These conductors have electrical insulation and are wrapped in helical strands of high-strength armor, which are typically made of steel. In the particular case of seven-strand wireline cable, there is a single insulated inner conductor wrapped by a helix of six insulated conductors, overlaid by two layers of inner and outer armor strands that are wrapped in opposing directions. In many applications, each conductor is assigned to a single dedicated analog or digital signal. Typical dimensions are about 0.04-inch (1 mm) for the diameter of each conductor and up to 30,000 ft (9146 m) for the length of the wireline, although variations from these typical values are common.

Electrically, the wireline cable acts as a distributed low-pass filter with frequency-dependent coupling, displaying a complex impedance characteristic with mutual impedance between conductors. A signal transmitted on any given channel (consisting of a voltage difference between two terminals) is subjected to attenuation (or reduction in signal amplitude) between the input signal and the output signal, This attenuation typically increases with frequency and is a result of "self-impedance." Self impedance is the resistance, capacitance and inductance of an individual conductor. Also, transmitting a signal on one set of conductive paths generates a corresponding signal on other paths by the existence of "mutual impedance" that results from capacitive and inductive coupling between the conductors. This coupling is known as crosstalk. Typically, for transmission systems such as a conventional multi-conductor wireline, the amplitude of the induced crosstalk signal increases with the frequency of the input signal.

As more fully described in U.S. Pat. Nos. 5,747,750 and 5,917,160 (Bailey, et al), a method has been developed to extend the usefulness of this conventional wireline to a greater number of data signals and to increase the maximum frequency bandwidth of these signals. In particular, this method was designed for use with a Triaxial Borehole Seismic (TABS) downhole logging tool to record microseismic acoustic data that are emitted by formations after fluids injection at fracturing rates. The TABS fracture mapping technology uses a relatively inexpensive, reusable, clamped logging tool and specialized data analysis methods to locate microseismic events. The induced fracture geometry may be inferred from maps composed of collections of such event source locations. Fracture azimuth, length, height, and orientation (vertical or horizontal) may be estimated from this data. Such data may be critical for optimizing the field development plan of a fracture stimulated reservoir.

Modern logging tools (e.g., TABS) are capable of producing large quantities of information characterizing subsurface formations. This information must be communicated or transmitted to the surface so that it may be utilized (e.g., to locate underground oil deposits or identify fracture propagation geometry). Data telemetry is no simple task since the number of signals to be transmitted may exceed the number of conductors, hereinafter referred to as "telemetric conductors," available in the wireline. Moreover, signal attenuation and frequency-dependent crosstalk commonly occur at higher frequencies in the data telemetry process, limiting the signal bandwidth.

Multi-channel frequency-modulated (FM) telemetry as described in the Bailey et al. patents was developed for the first generation of the TABS tool. Signal transmission by frequency modulation is preferred to amplitude modulation because the signal amplitude is significantly attenuated along the wireline, but the signal frequencies are preserved. At the surface data recorder, each frequency can be selected and demodulated to recover a facsimile of the original signal. In the prior art TABS system, seven channels of seismic data are transmitted on FM signals over four conductors, leaving three conductors for other uses. Data that is transmitted on these wire pairs have a bandwidth that begins to roll off significantly at 20 kHz (depending on the specific wireline configuration), limiting signal detectability at higher frequencies. Appropriate frequency spacing between channels is required for proper signal separation, and the overall design constraints force the use of lower frequency carrier channels that impose an overall bandwidth limit of about 500 Hz on the modulating and recovered signals.

U.S. Pat. No. 4,796,026 (Hammond) proposes a piezoelectric transducer for noise logging applications. Downhole circuitry is used to convert the noise signal amplitude to a variable pulse rate, similar to a voltage-to-frequency conversion process. In this reference, there is no discussion of transmission of downhole signals to the surface over multiple conductors.

In U.S. Pat. No. 3,514,750 (Pritchett), a multiple conductor encoding scheme for transmission of digitized signals is described. To mitigate the effects of wireline impedance coupling, signals of opposite polarity are transmitted simultaneously on alternate conductors. Encoding methods for 3, 4, 6, and 7 conductors are disclosed.

U.S. Pat. No. 5,062,084 (Schoepf) specifies a system for operating a downhole-digitizing acoustic tool on seven conductor wireline. Two conductors provide power, and the remaining cables provide digital data telemetry, including downlink communication in addition to the uplink data transfer. The system has distinct recording and transmitting modes. Therefore, Schoepfs downhole digitizing acoustic tool cannot provide full real-time data telemetry.

Finally, U.S. Pat. No. 4,646,083 (Woods) describes a system by which an analog signal is transmitted on a FM channel over a pair of wires. The frequency is not defined in the claims, but a value of 15 kHz is cited in the preamble. This signal is the summation of two square waves with frequencies that are proportional to two DC values, such as temperature and pressure. This reference does not consider the use of additional conductors or the assignment of conductors to particular signals to mitigate wireline impedance.

Previous attempts to address wireline telemetry have been based on the concepts of digital encoding, transmission of low frequency signals, and avoiding simultaneous transmission of multiple signals. The prior art does not include methods to transmit analog or digital signals at frequencies in excess of 20 kHz on oilfield wirelines of practical length and construction.

Accordingly, there is a need for an improved data telemetry system whereby analog or digital signals of up to 100 kHz can be transmitted uphole in a manner such that signal attenuation and crosstalk are reduced significantly. Preferably, this transmitted signal can contain multiple FM carrier bands in order to transmit multiple channels of analog or digital data that individually have bandwidths up to 3 kHz or higher. For maximum utility, the system must be capable of transmitting a large number of signals, far in excess of the number of conductor pairs available on the wireline.

SUMMARY OF THE INVENTION

In one embodiment, the present invention is a method to achieve a favorable reduction in attenuation and crosstalk transmission characteristics on a wireline having at least three telemetric conductors. This method comprises (a) connecting one end of the wireline to a data transmittal means at the first location and the other end of the wireline to a data receiver means at the second location, the data transmittal means having first and second output terminals, the data receiver means having first and second input terminals, wherein (1) at least two of the conductors are connected to the first output terminal of the data transmittal means and to the first input terminal of the data receiver means, and (2) at least one of the conductors is connected to the second output terminal of the data transmittal means and to the second input terminal of the data receiver means; (b) generating the data signal at the first location; (c) transmitting the data signal from the data transmittal means through the wireline to the data receiver means; and (d) receiving the data signal at the second location.

A second embodiment comprises (a) connecting one end of the wireline to a data transmittal means at the first location and the other end of the wireline to a data receiver means at the second location, the data transmittal means having first and second output terminals, the data receiver means having first and second input terminals, wherein (1) at least two of the conductors are connected to the first output terminal of the data transmittal means and to the first input terminal of the data receiver means, and (2) at least one of the conductors is connected to the second output terminal of the data transmittal means and to the second input terminal of the data receiver means; (c) generating the data signal at the first location; (d) digitizing the data signal; (e) modulating the digitized data signal to frequency-modulated carrier signals; (e transmitting the frequency-modulated carrier signals from the data transmittal means through the wireline to the data receiver means; (g) receiving the frequency-modulated carrier signal at the second location; and (h) demodulating the frequency-modulated carrier signals to recover the data signal.

The apparatus is a data telemetry system for use in transmitting a plurality of data signals from a first location to a second location. The apparatus comprises: (a) a multi-conductor wireline extending from the first location to the second location, the multi-conductor wireline containing at least three conductors; (b) data transmittal means at the first location for (1) converting the plurality of data signals into frequency modulated data signals, each of the frequency modulated data signals having a different center carrier frequency in the range of from about 1 kHz to about 100 kHz, (2) summing the frequency modulated signals to create a data input signal, and (3) transmitting the data input signal through the multi-conductor wireline, the data transmittal means having first and second output terminals; (c) and data receiver means at the second location for (1) receiving the data signal from the multi-conductor wireline, (2) separating the data input signal into the frequency modulated signals, and (3) demodulating the frequency modulated signals to obtain the plurality of data signals, the data receiver means having first and second input terminals; (d) wherein two of the conductors are connected at one end to the first output terminal of the data transmittal means and at the other end to the first input terminal of the data receiver means, and at least one of the conductors is connected at one end to the second output terminal of the data transmittal means and at the other end to the second input terminal of the data receiver means.

This invention is well suited to FM encoded data telemetry whereby multiple input signals are used to modulate multiple carrier frequencies.

BRIEF DESCRIPTION OF THE DRAWINGS

The present invention and its advantages will be better understood by referring to the following detailed description and the attached drawings in which.

DETAILED DESCRIPTION OF THE PREFERRED EMBODIMENTS

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

Conventional multi-strand wirelines that are widely available in the oilfield often have seven conductors. This is commonly known as "open-hole wireline" because it is generally used for formation evaluation logging tools. However, it may also be used for certain cased-hole logging tools. The number of strands typically limits the number of channels of data that may be transmitted to the surface. Since electrical power is usually required, often there are no more than six available data channels. The frequency bandwidth that may be transmitted is also limited, since frequencies in excess of 20 kHz are often severely attenuated and the transfer function (relationship of input and output of the system) becomes more irregular. The electrical impedance of long wirelines (often in excess of 20,000 ft) tends to limit the upper frequency bandwidth of these data because of signal attenuation and crosstalk.

Figure 1:
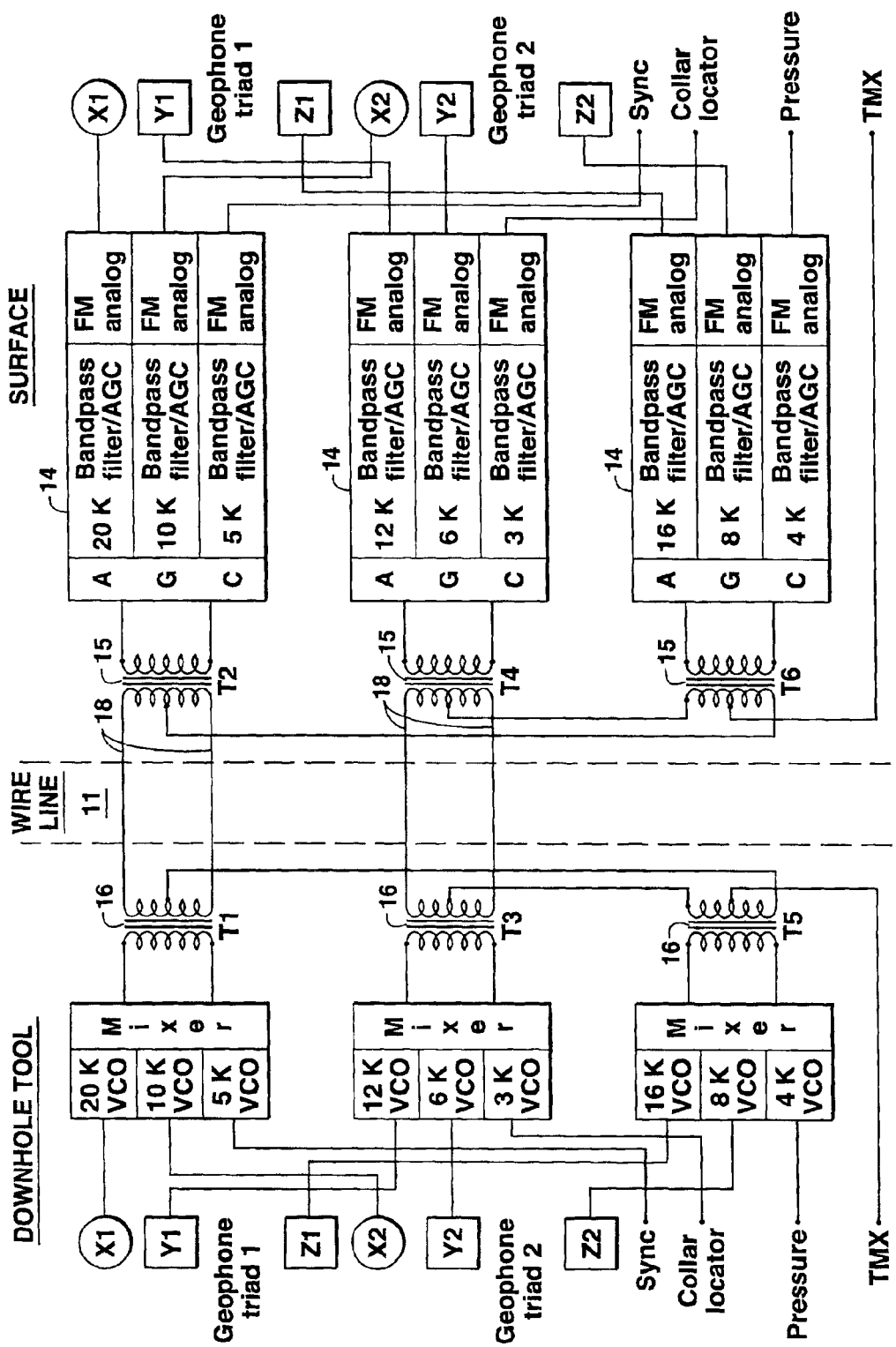
FIG. 1 is a schematic illustration of the prior art TABS tool data telemetry configuration, as described in U.S. Pat. Nos. 5,747,750 and 5,917,160.
Figure 2:
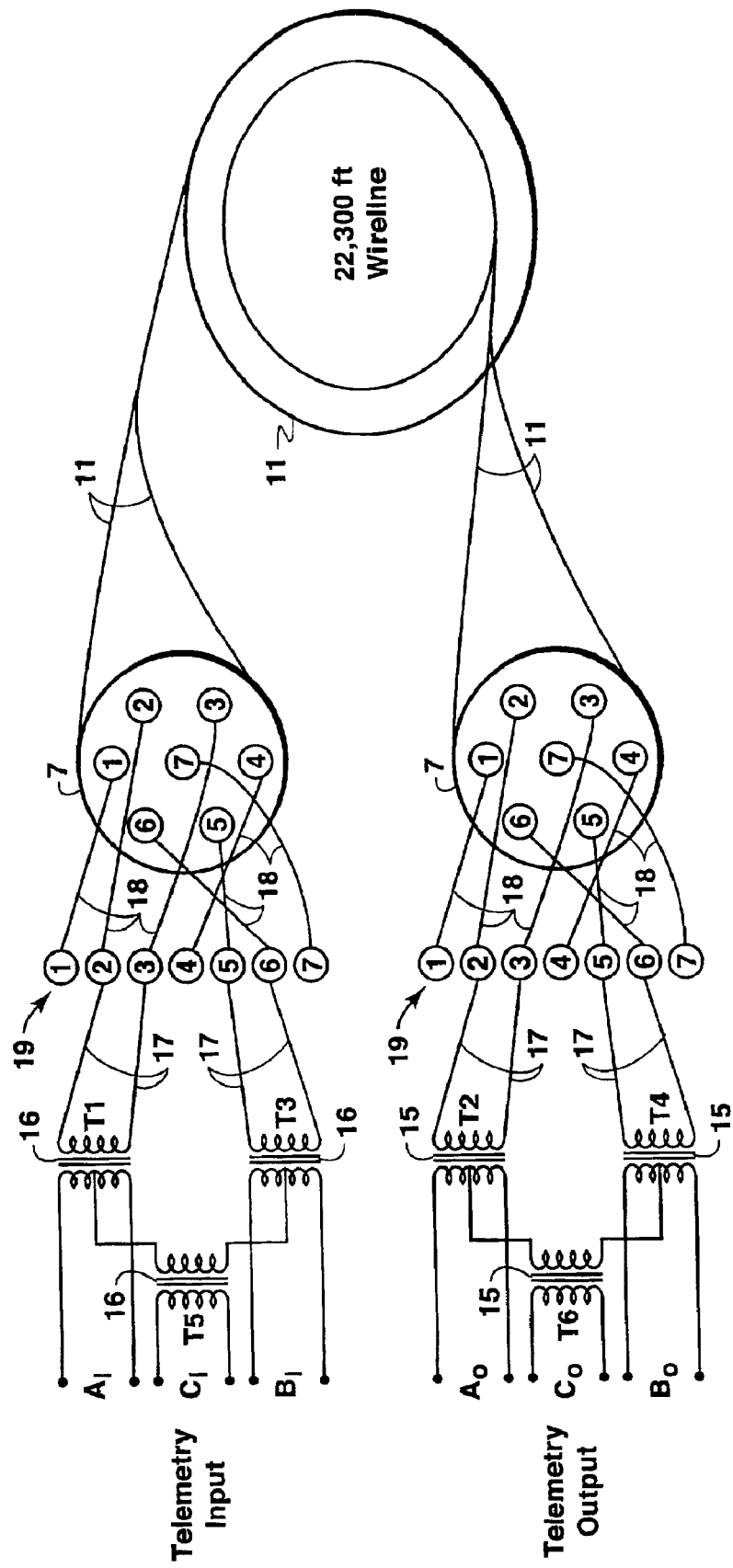
FIG. 2 is a schematic illustration of the test evaluation configuration to characterize the prior art TABS tool data telemetry method.

FIGS. 1 and 2 illustrate the current TABS tool telemetry configuration, showing the use of four conductors 18 within wireline 11 to transmit data on nine FM channels at carrier frequencies from 3 to 20 kHz. The transformers 15 and 16 (T1 through T6) are all identical devices. Transformers T1 and T3 are each connected across pairs of wireline conductors 18 at the downhole tool. These conductors 18 are connected to transformers T2 and T4, respectively, at the surface. Transformers T5 and T6 each have one lead connected to the centertap lead of the other two transformers (i.e. T5 is connected across the centertaps of T1 and T3 at the downhole tool, and similarly, T6 is connected across T2 and T4 at the surface).

The input (downhole) transformers 16 are arranged as 7:1 step-down transformers at the input end to the wireline 11 and 1:7 step-up output transformers 15 at the receiver end. It is desirable to reduce the voltage and increase the current of the signal to propagate the signal on the wireline with lower losses. The particular transformer designed and built for this application is fabricated on a 2616 core, consisting of a primary coil and secondary bifilar windings on a bobbin of 26 mm diameter and 16 mm height. The wire used is known as "magnet wire" and is typically 28 to 32 gauge wire with enamel insulation. The transformer efficiency is in the range of 95% to 98%.

The downhole tool and surface equipment, as shown in FIG. 1, are known in the art (i.e., U.S. Pat. Nos. 5,747,750 and 5,917,160). The downhole tool and surface equipment can be modified to use the new telemetry method described herein. Therefore, the improved method for data telemetry can provide improved transfer of data between the downhole tool and the surface equipment.

In the prior method, the signal fed into each downhole transformer 16 consists of the summation of three FM signals. For example, the 5, 10, and 20 kHz channels are summed and input to T1, the 3, 6, and 12 kHz channels are summed and input to T3, and the 4, 8, and 16 KHz channels are summed and input to T5. In general, a longer wireline length has greater attenuation at higher frequencies. In the absence of wireline crosstalk, the signal received at T2 would be that input to T1, only with frequency-dependent amplitude attenuation that depends on the wireline length and impedance. By design, this would relax the filter design parameters necessary to recover the individual 5, 10, and 20 kHz channels. However, with the conductor assignments shown in FIGS. 1 and 2, depending on the wireline 11 length and specific configuration, these signals couple into the signals on the T3–T4 and T5–T6 pairs of transformers. Therefore, it was necessary to design the banks of bandpass filters 14 at the surface unit to reject all frequencies except the desired signal frequency.

FIG. 2 schematically illustrates the test configuration on a 22,300 foot wireline 11 to evaluate the prior art TABS tool data telemetry method. The wireline 11 includes seven conductors numbered 1 through 7. Each conductor, except for the center conductor 7, is crosswise-paired or opposite to another conductor when the wireline 11 is cut perpendicularly. In the prior art data telemetry method there are three input data signals ($A_I$, $B_I$, and $C_I$) with the corresponding output data signals ($A_O$, $B_O$, and $C_O$). One terminal of each transformer 16 from the telemetry input or data transmittal means is connected or tied electrically (i.e., by a wire connection) 17 to a terminal strip 19 which is then electrically connected to an individual conductor 18 in a seven conductor wireline 11.

Figure 3:
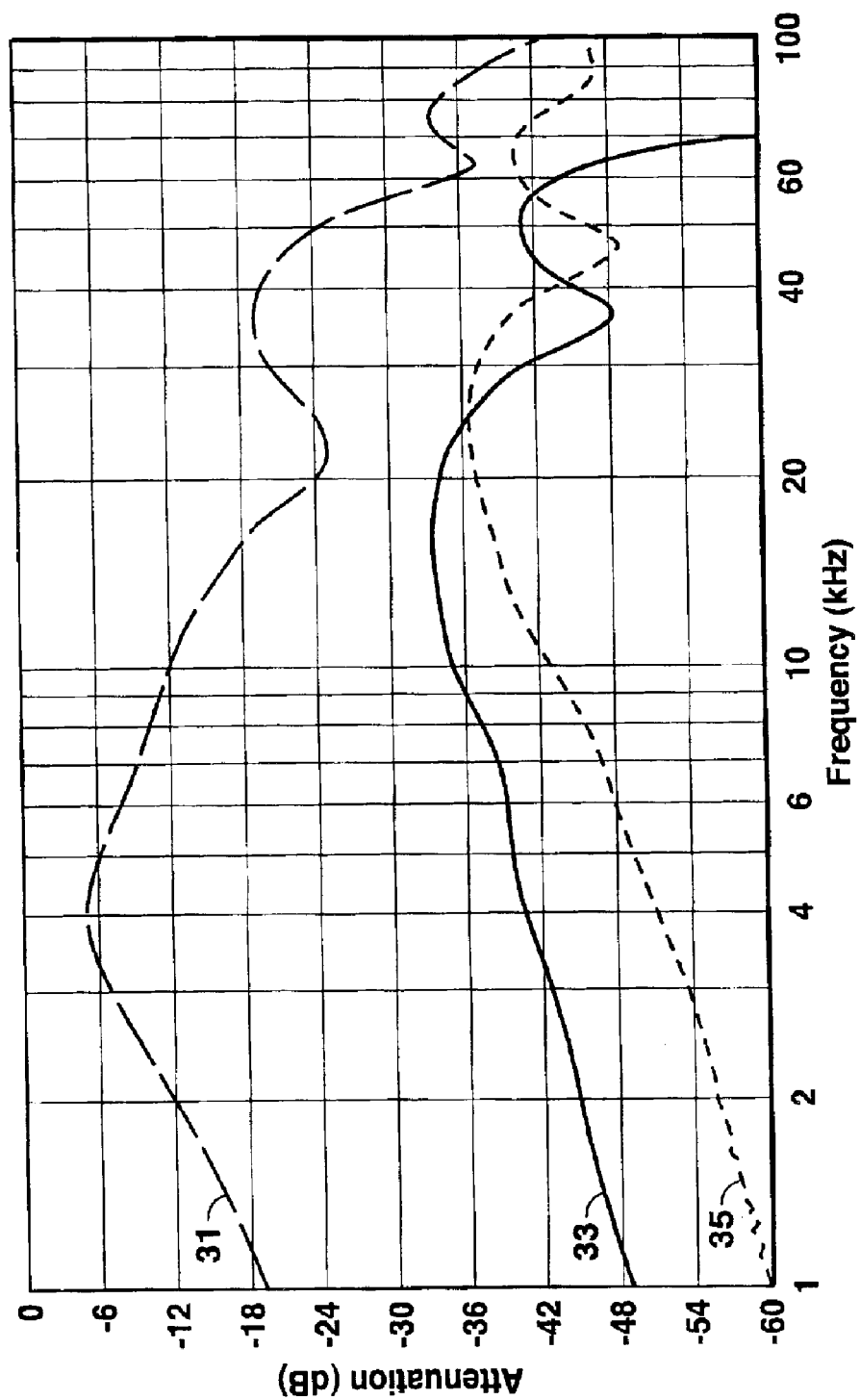
FIG. 3 illustrates the test evaluation results for the prior art method, showing the telemetry system input-output frequency response, including both self-impedance and mutual impedance effects.

FIG. 3 characterizes the effects of attenuation on one leg of a system configured as shown in FIGS. 1 and 2 operating on a 22,300 ft wireline. For the specific wireline impedance of this example, the response reaches a peak value of –5 dB at 4 kHz. The nondimensional unit of the decibel (dB) is used commonly in signal processing. It is a logarithmic transform such that the value in dB is equal to 20 times the log of the amplitude ratio. Thus, each 6 dB of attenuation corresponds to an amplitude reduction of a factor of two, and additive amounts on the decibel scale are multiplicative on a linear scale. Therefore, an attenuation of 6 dB corresponds to an amplitude reduction of a factor of 2; attenuation of 12 dB corresponds to an amplitude ratio of 4; attenuation of 18 dB is an amplitude ratio of 8; 24 dB is a ratio of 16; 30 dB of attenuation is a ratio of 32; 36 dB is a reduction factor of 64.

The frequency response 31 declines from –12 dB at 10 kHz to –24 dB at 20 kHz, varies between –20 to –24 dB to about 50 kHz, and then falls from –24 dB at 50 kHz to –42 dB at 100 kHz. The variable peaks and valleys in the response make compensation filtering difficult, particularly in that these specific deviations will vary with wireline length and other specific factors that are individual to each unit and will thus be subject to significant variability in a field environment.

The crosstalk that results from mutual impedance between conductors is also illustrated in FIG. 3. The lower response curves correspond to signals measured on two other conductor pairs (1 & 4) 33 and (5 & 6) 35 that result from transmission of a signal on the original conductor pair (2 & 3) 31. Beyond about 60 kHz, the signals on the conductor pairs (1 & 4) 33 and (5 & 6) 35 are nearly as strong as the transmitted signal (2 & 3) 31.

These characteristics pose difficulty in signal reconstruction, both because of the amount of gain required to recover the mean downhole signal amplitude and the variability of the response at different frequencies within the desired bandwidth of 10 to 100 kHz. Experience with the system designed and built according to FIGS. 1 and 2 has shown that the lower frequency channels are marginally acceptable for seismic data transmission, with amplitude and phase response that are inferior to the channels above 10 kHz. The carrier frequency should be at least ten times the frequency of the desired input signal bandwidth for high fidelity reconstruction.

According to the present invention, the limitations imposed on downhole data telemetry to the surface are reduced by increasing the number of transmitted channels and by utilization of higher frequency carrier channels than can be normally transmitted on conventional seven-strand wireline cable. Specifically, the telemetry method of the present invention increases the number of available channels and increases the transmitted data bandwidth relative to the system described in FIGS. 1, 2, and 3.

One embodiment is to use carrier frequencies at successive multiples of each other. To avoid excessive filtering, successive frequencies should be at least a multiple of 1.1 (e.g., 10, 11, 12.1, 13.3 . . . kHz). Furthermore, to fit a favorable number of channels, the multiple should not be more than 10 (e.g., 1, 10, 100 kHz). A preferred embodiment is to choose a multiple of about 1.25 starting at about 15 kHz. The selection of a group consisting of 14.9, 18.7, 23.3, 29.2, 36.5, 45.5, 57.0, 71.2, 89.0 kHz is one such choice. Another embodiment is to choose carrier frequencies that are prime numbers. Use of prime numbers for the carrier frequency can limit harmonic interference. Harmonic interference is when any integral multiple of a carrier frequency falls within a bandwidth of another carrier frequency.

Figure 4:
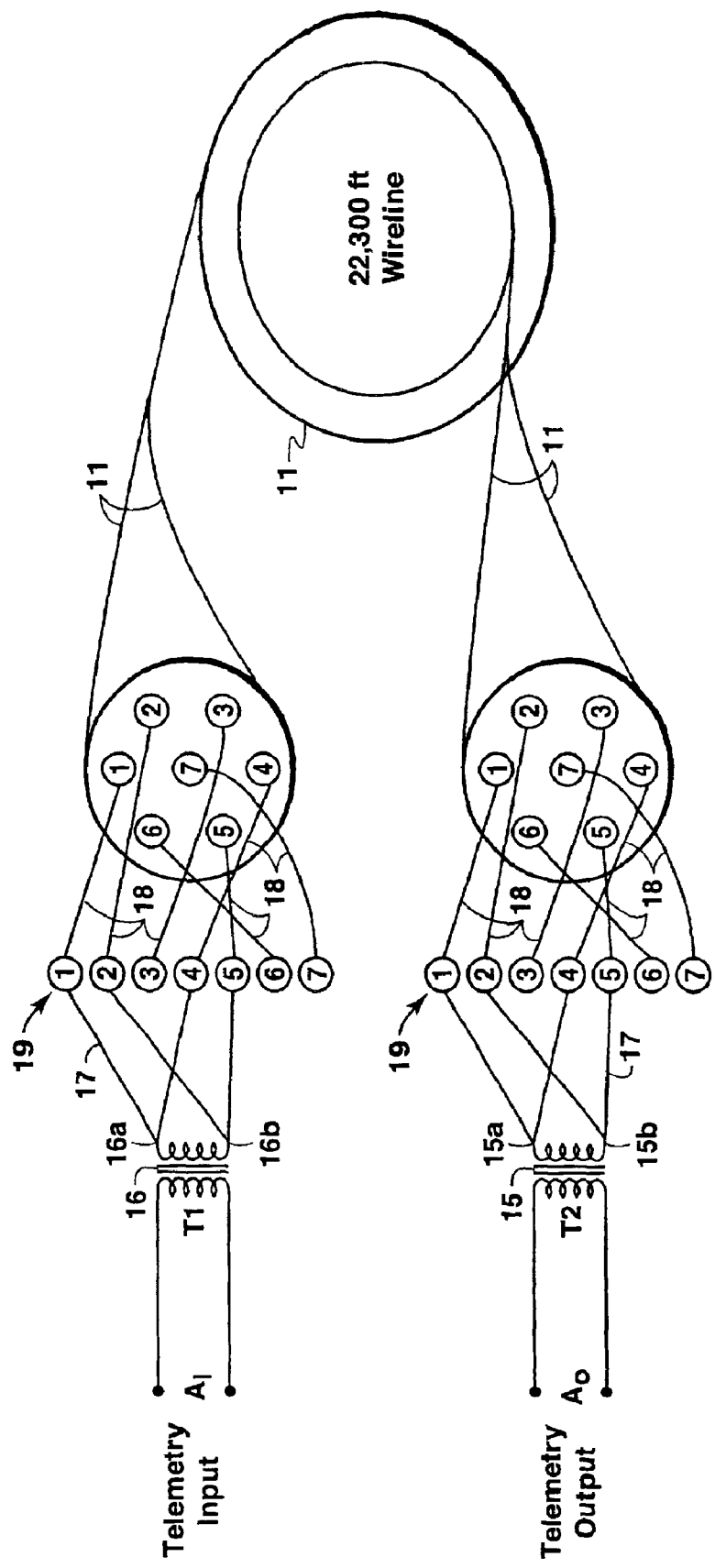
FIG. 4 is a schematic illustration of the test configuration of one embodiment of the present invention, illustrating the method of pairing opposing wires on two terminals.

FIG. 4 is a schematic that illustrates one embodiment of the invention and the test configuration that was used to evaluate the invention. An input signal consisting of a swept sine wave was applied to the "Telemetry Input," and the output signal was received at the "Telemetry Output." The signal was transmitted through a 22,300 foot wireline. A modern electronic instrument, such as a Stanford Research Systems SRS785 spectrum analyzer, may be used to provide the input signal and to process/display the output signal.

For the embodiment illustrated in FIG. 4, one terminal of each transformer (terminals 15a and 16a) is tied to conductors 1 & 4, and the other terminals (15b and 16b) are connected to conductors 2 & 5. It should be noted that conductors 1 & 4 and conductors 2 & 5 are crosswise-paired or "opposing pairs." Other examples of wireline configurations of groups of two opposite or crosswise-paired conductors include the groups consisting of the following conductors: 1 & 4 and 2 & 5, 1 & 4 and 3 & 6, 2 & 5 and 1 & 4, 2 & 5 and 3 & 6, 3 & 6 and 2 & 5, 3 & 6 and 1 & 4.

This means that conductor 4 is located on the opposite side of wireline 11 from conductor 1 and, similarly, conductor 5 is opposite conductor 2. The selection of specific pairs is arbitrary, so long as each conductor wire is tied to the opposing wire (pairing with opposite conductors). There was improvement in the frequency response for alternative arrangements, such as connecting one terminal to conductors 1 & 2 and the other terminal to 4 & 5, but these alternatives were found to be inferior to using opposing pairs.

Figure 5:
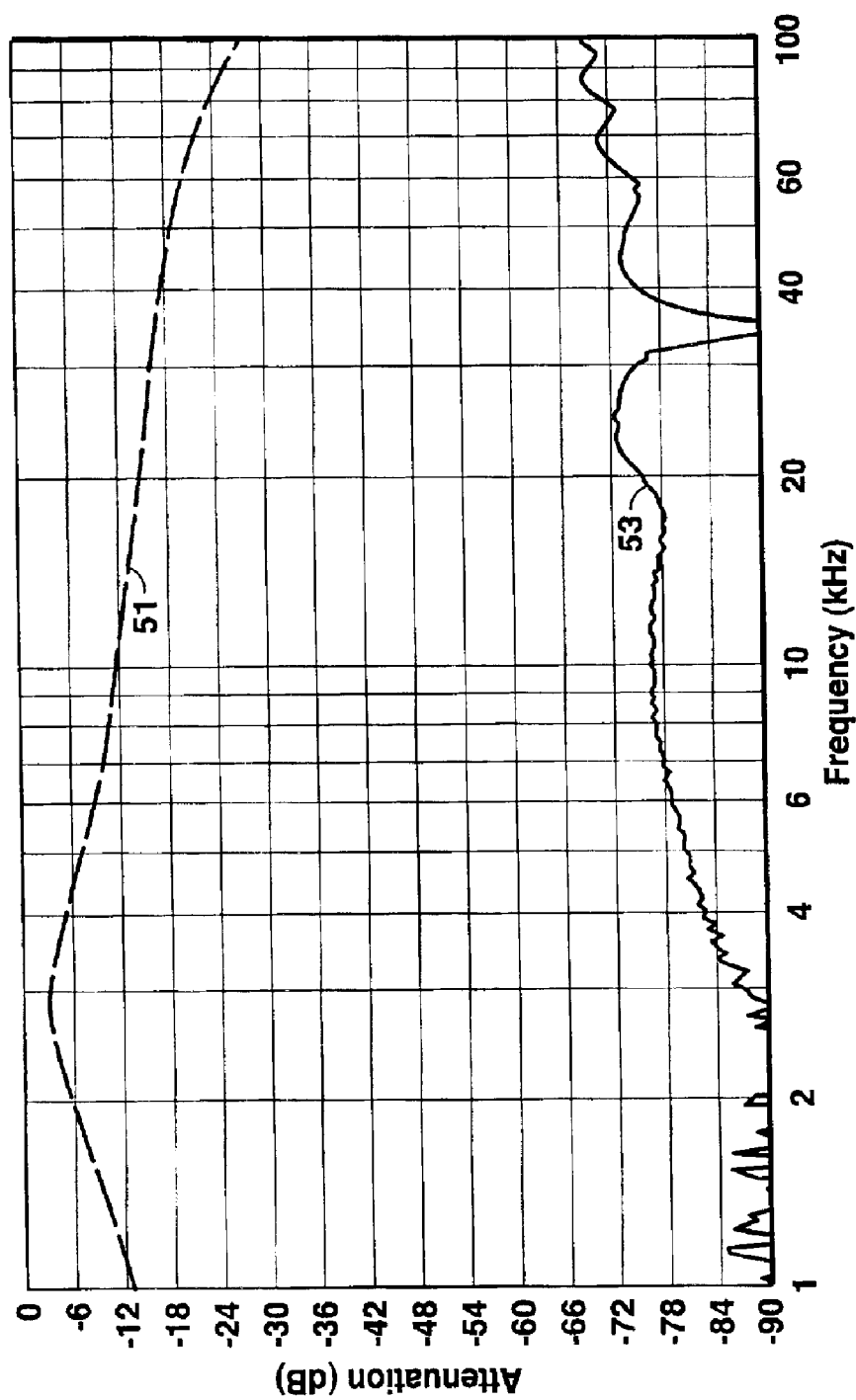
FIG. 5 illustrates the test evaluation results for the inventive method, for the specific embodiment of FIG. 4.

FIG. 5 illustrates the frequency response for the embodiment shown in FIG. 4 (pairing conductors 1 & 4 and 2 & 5) 51. The peak response 51 is −4 dB at 3 kHz, with a smooth and gradual decline to −27 dB at 100 kHz. Over the frequency range from 10 to 100 kHz, only 15 dB of attenuation is observed, indicating a steady response characteristic with no drastic attenuation changes. This is a significant improvement to the response seen in FIG. 3, in which a 30 dB decline is seen in a very uneven fashion from 10 kHz to 100 kHz. Note that a decline of 15 dB is a factor of 5.6 reduction in signal amplitude, whereas a 30 dB decline corresponds to a factor of 32 reduction in signal strength. A compensation filter for the system of FIG. 5 is far more readily obtained, because there are no peaks and valleys and also because the reduction in attenuation will increase the signal-to-noise ratio significantly.

Also shown in FIG. 5 is the frequency response 53 of the signal induced on the 3 & 6 conductor pair while transmitting on the 1 & 4 and 2 & 5 conductor pairs. The scale of the graph had to be modified to show this response, because the amplitude is less than −70 dB over the entire frequency range. Therefore, this system has very low crosstalk onto other conductors.

Figure 6:
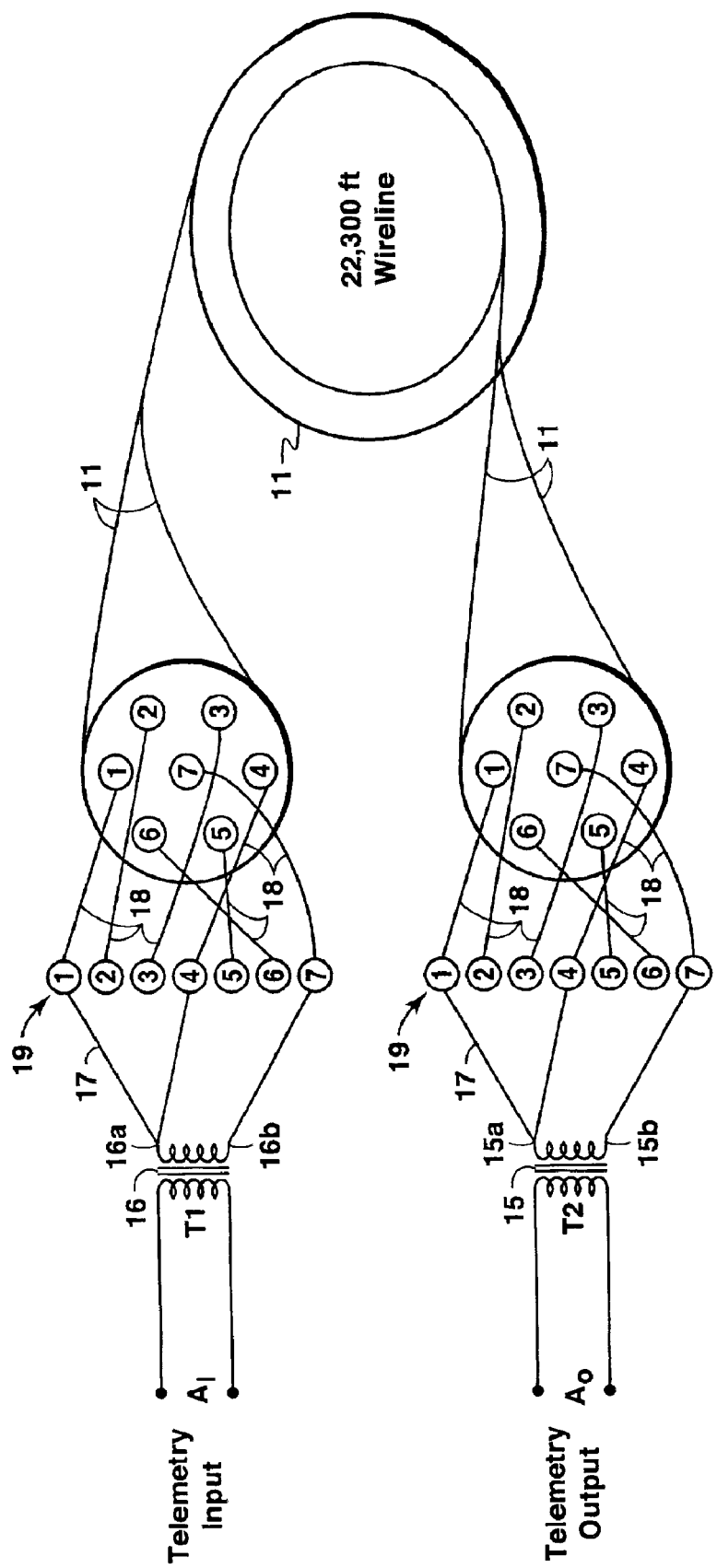
FIG. 6 is a schematic illustration of a test configuration used to illustrate the embodiment of pairing of opposing wires on one terminal only.

An alternative embodiment is illustrated in FIG. 6. This method uses only three conductors 18 to transmit signals. One terminal of each transformer (terminals 15a and 16a) is tied to conductors 1 & 4, and the remaining terminals (15b and 16b) are attached to the center conductor 7. This system would be appropriate if a design tradeoff were required so that four conductors would be available for other uses.

Figure 7:
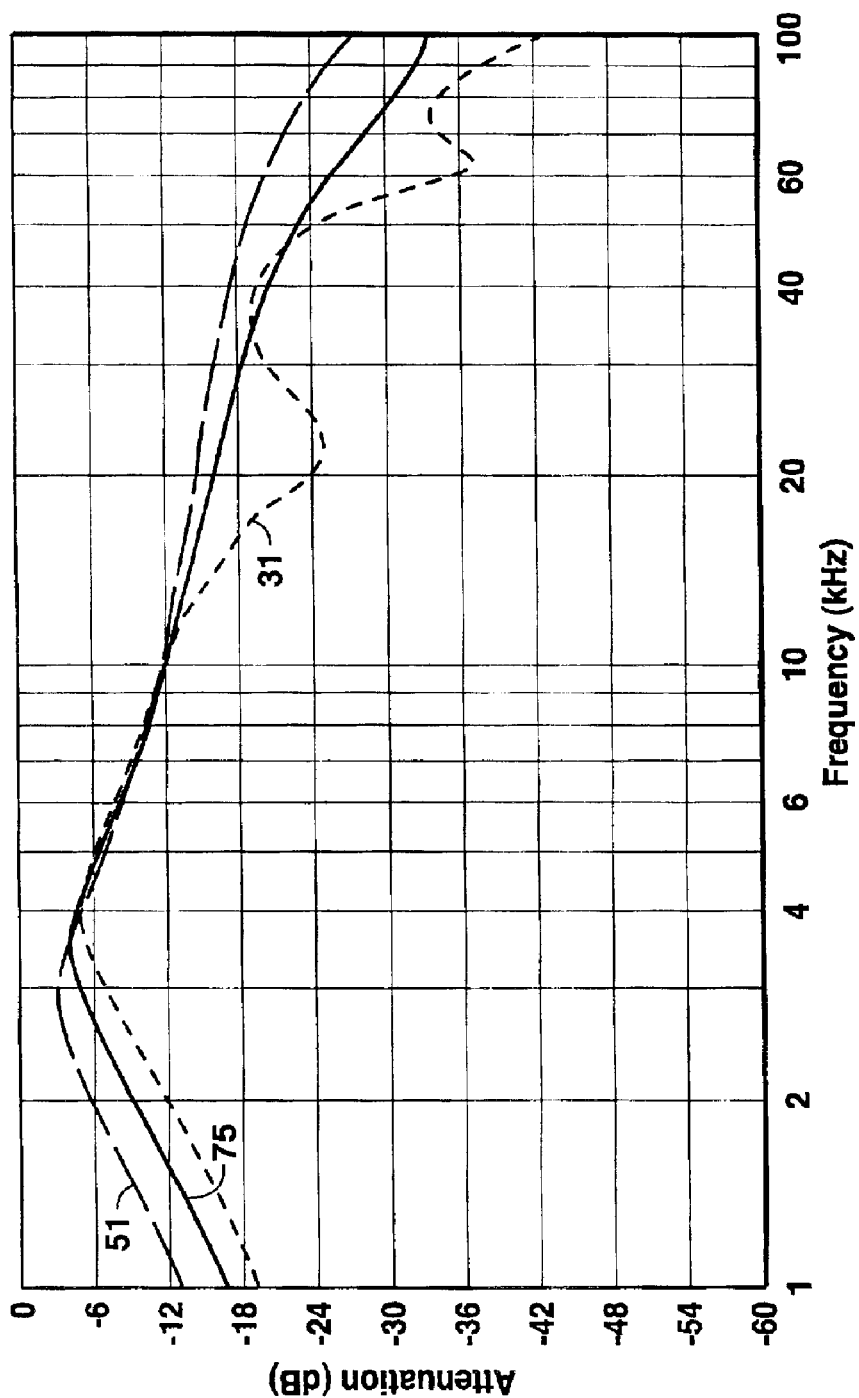
FIG. 7 illustrates the test evaluation results for the self-impedance characterization of the systems illustrated in FIGS. 2, 4, and 6.

The frequency responses of each of these systems are provided in FIG. 7 for comparison. It may be seen that the response of a preferred embodiment (transmitting on 1 & 4 and 2 & 5, FIGS. 4 and 5) 51 has the least attenuation, and the prior art method (transmitting on 2 and 3, FIGS. 1, 2, and 3) 31 has the greatest attenuation. The three-wire system (transmitting on 1 & 4 and 7) 75 has an intermediate characteristic. The advantage of the latter method over the prior art is a modest reduction in attenuation with a pronounced reduction in the variability of the response over the desired frequency band of 10 to 100 kHz. A compensation filter is far easier to design for the system of FIG. 6 than for that of FIG. 2.

Figure 8:
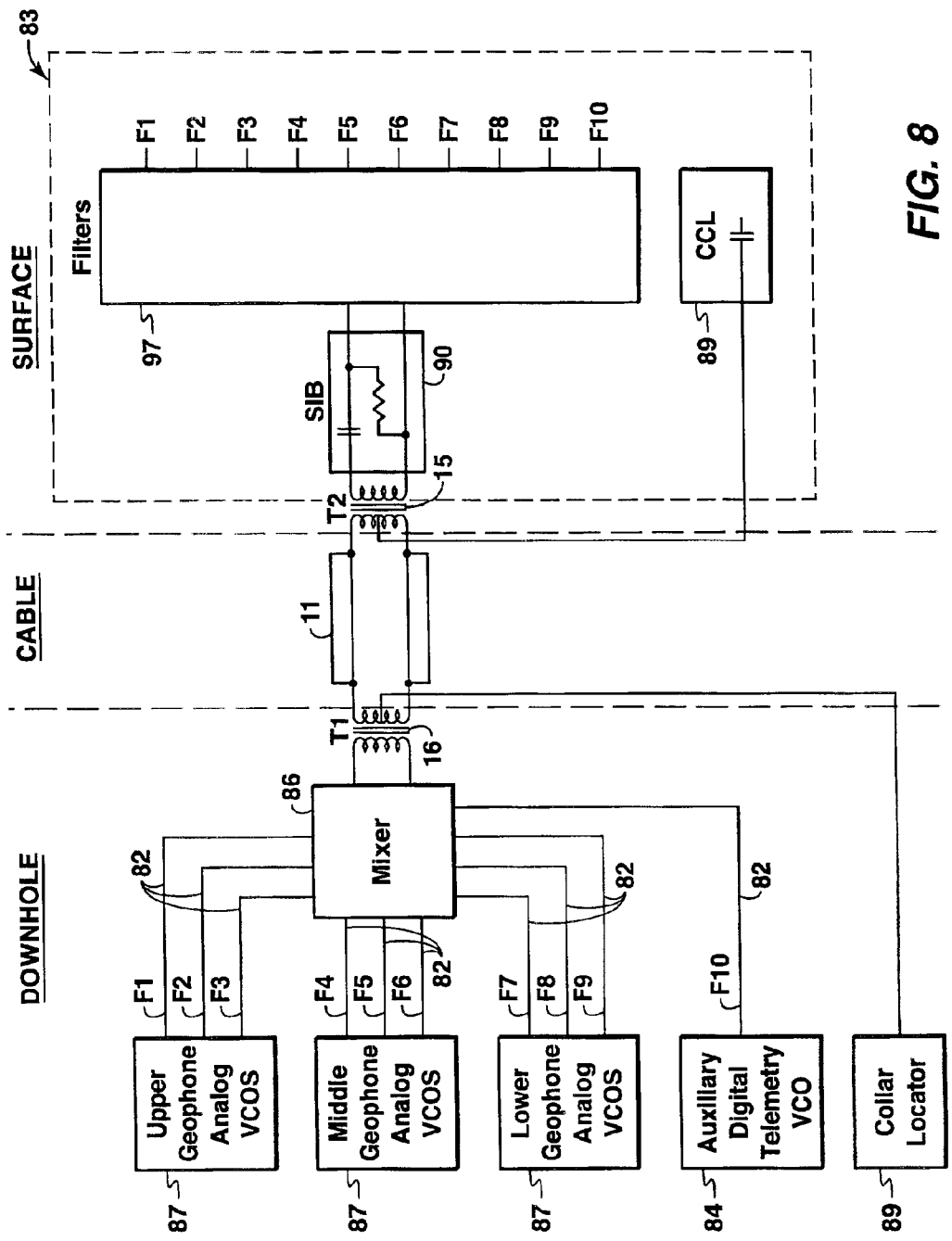
FIG. 8 is a schematic illustration of a telemetry system for the TABS tool that uses the inventive method as shown in FIG. 4.

The system of FIG. 1 may be revised in light of the frequency response improvement, resulting in the system of FIG. 8 which is provided to illustrate one illustrative means of implementing the inventive method. In FIG. 8, the downhole systems are located on the left of the graph, the wireline cable 11 is in the middle, and the surface receiver systems are on the right side. A total of ten FM channels 82 are identified, including nine seismic channels (F1–F9) that support three triads of orthogonal geophones. The analog geophone output signals are passed through voltage-controlled oscillators (VCOS) 87 to generate sinusoidal signals with small frequency variations about center carrier frequencies operating in the range of 10 to 100 kHz. Thus, the input voltage signals are transformed into signals with frequency variations, about distinct carrier frequencies.

In the embodiment of FIG. 8, the data transmittal means are the transformer 16 located both downhole and on the surface of the earth. However, persons skilled in the art would understand that other known devices (e.g., high-current output amplifier with isolation at the transmittal means and high impedance input device at the receiver means) could be used as the data transmittal means and receiver means.

One embodiment uses an auxiliary digital telemetry voltage-controlled oscillator (VCO) 84 that operates at a lower frequency than the analog channels. This "digital FM channel" can be implemented by digital modulation of each full or half wave of a sinusoid. For example, a wavelength may be modulated at a low frequency (i.e., 3.6 kHz) to transmit a "0" and a high frequency (i.e., 4.2 kHz) for a "1". This may be determined by measuring the period between zero crossings in the detector and assigning a "0" to a long period and a "1" for a short period. This method provides for downhole-digitized data to be sent directly uphole. In the system of FIG. 8, there is one such digital FM channel F10 that transmits multiplexed digital data from several devices (i.e., wellbore pressure, wellbore temperature, tool temperature, tool voltage, tool inclination and tool azimuth). The update period to service all of the devices is on the order of a few seconds.

In the Mixer 86, these FM signals (up to ten or more) are then summed together to create a single input signal that contains all of the real-time data from this tool. This signal is applied to the inputs of a single step-down output transformer 16 and is subsequently transmitted uphole over two pairs of wires using the inventive method. The system shown in FIG. 8 also includes the transmission of an auxiliary casing collar locator (CCL) 89 signal on the transformer secondary centertap lines.

At the surface 83, the signal is applied to the inputs of a complementary step-up transformer 15. The transformer outputs are then passed into a "Surface Input Board" (SIB) 90 which has a compensating high-pass filter to balance the signal across the frequency band. The SIB also has an automated gain section to boost the signal to a specified level. This filter section consists of cascaded sections of a simple RC (resistance and capacitance) filter design, with parameters selected to flatten the signal over the desired bandwidth and to reject low frequency noise that may be present.

Figure 9:
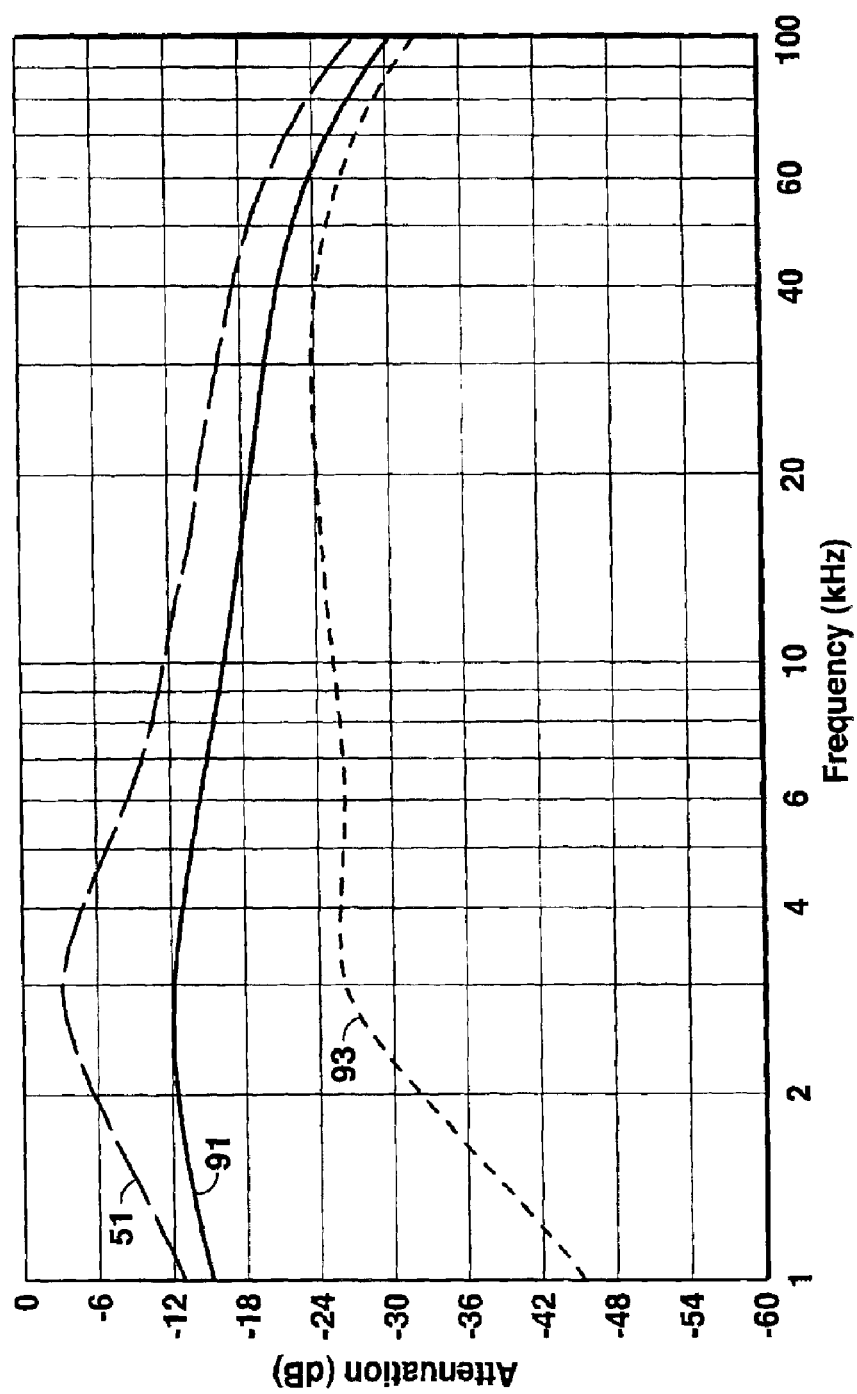
FIG. 9 is a graph showing the frequency response for different termination characteristics (resistor R and capacitor C values) at the terminals of the surface transformer as illustrated in FIG. 8.

FIG. 9 illustrates the signal of the inventive method with no compensation (FIG. 5) 51. The system response with an R value of 5 kΩ and no capacitance C (91) and the preferred approach of using a 5 kΩ (kilo-ohms) resistor R and an 820 pF (picofarads) capacitor C (93) are also shown. The compensation filters measurably flatten the system response with some reduction in overall signal amplitude. The purpose of the compensation filtering is to achieve a small deviation in amplitude response as a function of frequency over the desired signal bandwidth of approximately 1 kHz to 100 kHz. The gain portion of the SIB 90 then increases the signal strength to a specified level.

The output signal from the compensation filter may then be passed into a surface unit system that performs demodulation and signal reconstruction, in either the analog or digital domain. As shown in FIG. 8, a comb filter (frequency selection filter) or bank of bandpass filters 97 is used to select each of the carrier frequencies. The bandpass filters 97 are followed by individual signal FM demodulation known to those skilled in the art. The recovered signals may have frequency content up to 3 kHz or more and may be sampled at 10 kHz or higher. The data telemetry rate of a system that transmits ten such signals that are sampled at 16 bits at a rate of 10 kHz will have a data throughput rate of 200 kBytes/sec. Furthermore, this has been accomplished using downhole equipment of relative simplicity, high reliability, and low cost. The surface equipment may be upgraded easily to take advantage of the latest products offered by the burgeoning digital signal processing industry without regard for temperature and space limitations.

The telemetry method can be combined with the TABS tool for formation fracture plane identification by microseismic monitoring from an offset well. Formation fractures are generated by injection of fluids into rocks at high pressures (above the fracture gradient of the formation) and typically form planar "fracture wings" that are oriented along a specific azimuth angle through the injection well. The azimuth angle may be determined within a few degrees, either by microseismic monitoring or other methods (i.e., tiltmeter fracture monitoring).

A microseismic monitoring tool such as the TABS took may be located in an adjacent monitoring well (offset well) or in the well undergoing fracture stimulation to record events during and after a fracture stimulation. Then the fracture dimensions may be estimated (including growth of the fracture during the pumping stages) using direction vectors calculated from the microseismic event data. These direction vectors consist of pairs of azimuth and inclination angles. The intersection of each of these vectors and a plane through the injection wellbore determines points of origin for the microseismic sources. A sequence of such points determines a progression of microseismic activity that is associated with fracture growth. The telemetry method would permit the transmission of a large number of signals that would be necessary to monitor the microseismic events during a fracture stimulation.

In certain situations (i.e., limited available data quality or quantity), it may be feasible to reduce the number of unknowns to two by specifying that the source location is constrained to lie in a two-dimensional region in three-dimensional space. The constrained region may be described as a plane, quadratic surface, or a higher order surface. The constraint reduces the number of degrees of freedom in the event solution from three to two. The geometry of the constrained surface, and the location of event sources on that surface, may be determined by error minimization based on source measurements.

The telemetry method can be useful in other logging tool designs that could accomplish one or more of the following open-hole or cased-hole well logging objectives (the list below illustrates representative applications but is not meant to be limiting). The list includes: caliper logs; cement bond logs; depth logs, including casing collar locator and gamma ray logs; downhole video logs; formation resistivity and radial microimager logs; neutron logs, including flowing neutron and pulsed neutron capture logs; oriented density logs; production logs, including fluid rate, density, and capacitance logs; radial differential temperature logs; radioactive tracer logs; sonic, ultrasonic, and noise logs; temperature and pressure logs; and well surveying logs.

By rearranging the wireline conductor assignments and signal mixing, a superior wireline analog signal transfer function is obtained. This improved characteristic enables significant revisions to the telemetry, with support for more than nine seismic channels that are capable of up to 3 kHz bandwidth or more.

The foregoing description has been directed to particular embodiments of the invention for the purpose of illustrating the invention. It will be apparent to persons skilled in the art, however, that many alternatives, modifications, and variations to the embodiments described herein are possible. All such alternatives, modifications, and variations are intended to be within the scope of the present invention, as defined by the appended claims.

We claim:

1. A method for improved telemetry of a data signal from a first location to a second location using a wireline having at least three conductors, comprising:
   (a) connecting one end of said wireline to a data transmittal means at said first location and the other end of said wireline to a data receiver means at said second location, said data transmittal means having first and second output terminals, said data receiver means having first and second input terminals, wherein
      (1) at least two of said conductors are connected to said first output terminal of said data transmittal means and to said first input terminal of said data receiver means, wherein said two of said conductors are not directly adjacent to each other and
      (2) at least one of said conductors is connected to said second output terminal of said data transmittal means and to said second input terminal of said data receiver means;
   (b) generating said data signal at said first location;
   (c) transmitting said data signal from said data transmittal means through said wireline to said data receiver means; and (d) receiving said data signal at said second location.

2. The method of claim 1, wherein said data signal is stored, decoded, processed and displayed after receiving said data signal.

3. The method of claim 1 wherein said wireline has at least four conductors.

4. The method of claim 1 wherein said wireline is deployed in a wellbore, said first location is a downhole location in said wellbore, and said second location is at the surface of the earth, and wherein said data signal is generated by a well logging tool at said downhole location.

5. The method of claim 4 wherein said well logging tool is chosen from the group consisting of the following: caliper logs, cement bond logs, depth logs, downhole video logs, formation resistivity logs, radial microimager logs, neutron logs, oriented density logs, production logs, radial differential temperature logs, radioactive tracer logs, sonic logs, ultrasonic logs, noise logs, temperature logs, pressure logs, well surveying logs, and any combination thereof.

6. The method of claim 1 further comprising filtering of said data signal to achieve a small deviation in amplitude response as a function of frequency over the desired signal bandwidth of approximately 1 kHz to 100 kHz or any desired interval therein.

7. The method of claim 6 wherein the compensation filter consists of cascaded high-pass RC filters that are chosen to achieve a favorable system transfer function that is characterized by a small deviation in amplitude response as a function of frequency.

8. The method of claim 1 wherein said two conductors connected to said first output terminal of said data transmittal means and to said first input terminal of said data receiver means are crosswise paired with opposite conductors.

9. The method of claim 8 wherein said wireline includes seven conductors numbered 1 through 7, wherein conductor 7 is in the center of said wireline and conductors 1 through 6 are arranged in a circle around conductor 7, and said data signals are carried on crosswise-paired conductors.

10. The method of claim 8 wherein said wireline includes seven conductors numbered 1 through 7, wherein conductor 7 is in the center of said wireline and conductors 1 through 6 are arranged in a circle around conductor 7, and said signals are carried on conductor 7 and on one set of crosswise paired conductors.

11. The method of claim 1 wherein said data signal is transmitted using frequency modulated telemetry.

12. The method of claim 11 wherein said data signal is transmitted using frequency modulated telemetry, with center carrier frequency within the range of 1 kHz to 100 kHz.

13. The method of claim 12 wherein said carrier frequencies are selected from the group consisting of 14.9, 18.7, 23.3, 29.2, 36.5, 45.5, 57.0, 71.2, 89.0 kHz, and any combination thereof.

14. The method of claim 11 wherein said data signal comprises at least two separate data components and each data component is transmitted on its own carrier frequencies.

15. The method of claim 14 wherein said carrier frequencies are selected to be placed at approximately fixed multiples of each other, and said system frequency multiplier is at least 1.1 and not more than 10.

16. The method of claim 14 wherein said carrier frequencies are chosen to be prime numbers.

17. A method for improved telemetry of a data signal from a first location to a second location using a wireline having at least three conductors, comprising:
(a) connecting one end of said wireline to a data transmittal means at said first location and the other end of said wireline to a data receiver means at said second location, said data transmittal means having first and second output terminals, said data receiver means having first and second input terminals, wherein
(1) at least two of said conductors are connected to said first output terminal of said data transmittal means and to said first input terminal of said data receiver means, wherein said two of said conductors are not directly adjacent to each other and
(2) at least one of said conductors is connected to said second output terminal of said data transmittal means and to said second input terminal of said data receiver means;
(b) generating said data signal at said first location;
(c) digitizing said data signal;
(d) modulating said digitized data signal to frequency-modulated carrier signals;
(e) transmitting said frequency-modulated carrier signals from said data transmittal means through said wireline to said data receiver means;
(f) receiving said frequency-modulated carrier signal at said second location; and
(g) demodulating said frequency-modulated carrier signals to recover said data signal.

18. The method of claim 17 wherein multiple frequency bands are used to transmit said data signal.

19. The method of claim 17 in which said digitized data signal is transmitted on a carrier frequency in the range of 1 kHz to 100 kHz.

20. The method of claim 17 wherein two said conductors are crosswise paired with opposite conductors.

21. The method of claim 20 wherein said wireline includes seven conductors numbered 1 through 7, wherein conductor 7 is in the center of said wireline and conductors 1 through 6 are arranged in a circle around conductor 7, and said signals are carried on crosswise-paired conductors.

22. The method of claim 20 wherein said wireline includes seven conductors numbered 1 through 7, wherein conductor 7 is in the center of said wireline and conductors 1 through 6 are arranged in a circle around conductor 7, and said signals are carried on conductor 7 and on one set of crosswise paired conductors.

23. A data telemetry system for use in transmitting a plurality of data signals from a first location to a second location, comprising:
(a) a multi-conductor wireline extending from said first location to said second location, said multi-conductor wireline containing at least three conductors;
(b) data transmittal means at said first location for (1) converting said plurality of data signals into frequency modulated carrier signals, each of said frequency modulated carrier signals having a different center carrier frequency in the range of from about 1 kHz to about 100 kHz, (2) summing said frequency modulated carrier signals to create a data input signal, and (3) transmitting said data input signal through said multi-conductor wireline, said data transmittal means having first and second output terminals; and
(c) data receiver means at said second location for (1) receiving said data signal from said multi-conductor wireline, (2) separating said data input signal into said frequency modulated signals, and (3) demodulating said frequency modulated signals to obtain said plurality of data signals, said data receiver means having first and second input terminals;
(d) wherein two of said conductors are connected at one end to said first output terminal of said data transmittal means and at the other end to said first input terminal of said data receiver means, with said two of said conductors not being directly adjacent to each other and at least one of said conductors is connected at one end to said second output terminal of said data transmittal means and at the other end to said second input terminal of said data receiver means.

24. The apparatus of claim 23 wherein said wireline has at least four conductors and said conductors are crosswise paired with opposite conductors.

25. The apparatus of claim 23 wherein said wireline includes seven conductors numbered 1 through 7, wherein conductor 7 is in the center of said wireline and conductors 1 through 6 are arranged in a circle around conductor 7, and said signals are carried on crosswise paired conductors.

26. The apparatus of claim 23 wherein said wireline includes seven conductors numbered 1 through 7, wherein conductor 7 is in the center of said wireline and conductors 1 through 6 are arranged in a circle around conductor 7 and wherein said signals are carried on conductor 7 and on one set of crosswise paired conductors.

27. The apparatus of claim 23 wherein said data transmitted means is a transformer and said data receiver means is a transformer.

* * * * *